(12) United States Patent
Völker

(10) Patent No.: US 10,566,733 B2
(45) Date of Patent: Feb. 18, 2020

(54) ENCLOSURE FOR A CONNECTOR ON A CABLE

(71) Applicant: HUBER+SUHNER AG, Herisau (CH)

(72) Inventor: Michael Lothar Völker, Sax (CH)

(73) Assignee: Huber+Suhner AG (CH)

( * ) Notice: Subject to any disclaimer, the term of this patent is extended or adjusted under 35 U.S.C. 154(b) by 0 days.

(21) Appl. No.: 16/312,471

(22) PCT Filed: Jun. 21, 2017

(86) PCT No.: PCT/EP2017/065205
§ 371 (c)(1),
(2) Date: Dec. 21, 2018

(87) PCT Pub. No.: WO2017/220639
PCT Pub. Date: Dec. 28, 2017

(65) Prior Publication Data
US 2019/0157800 A1 May 23, 2019

(30) Foreign Application Priority Data

Jun. 24, 2016 (CH) .................................. 0805/16

(51) Int. Cl.
*H01R 13/58* (2006.01)
*G02B 6/38* (2006.01)
(Continued)

(52) U.S. Cl.
CPC ....... *H01R 13/5825* (2013.01); *G02B 6/3849* (2013.01); *G02B 6/3879* (2013.01);
(Continued)

(58) Field of Classification Search
CPC ................ H01R 13/5825; H01R 13/74; H01R 13/5205; H01R 13/625; H01R 9/032;
(Continued)

(56) References Cited

U.S. PATENT DOCUMENTS 3,678,445 A * 7/1972 Brancaleone ...... H01R 13/6582
439/607.17
5,267,878 A * 12/1993 Shinji ................... H01R 9/032
439/607.5

(Continued)

FOREIGN PATENT DOCUMENTS

DE        3512578 A1    10/1986
DE        3604213 A1     8/1987

(Continued)

OTHER PUBLICATIONS

International Search Report and Written Opinion for Int. App. No. PCT/EP2017/065205, dated Aug. 28, 2017.

*Primary Examiner* — Jean F Duverne
(74) *Attorney, Agent, or Firm* — McDonnell Boehnen Hulbert & Berghoff LLP

(57) ABSTRACT

The invention is directed to an enclosure (1) for a connector on a cable. The enclosure (1) comprises a flange (2) having a base plate (4) with an opening (3) for the cable. First connecting means (7) are arranged around the opening. The enclosure furthermore comprises a plug (9) comprising a plug body (10) with a first end (11) foreseen to interact in a mounted position with the base plate of the flange (2) and a second end (12). A sleeve (14) encompasses in a mounted position the plug body (10) and comprises second connecting means (15) is provided. The second connecting means (15) are foreseen to interact in a mounted position with the first connecting means (7) of the flange (2). The sleeve (14) comprises a first thread (16) and a gland nut (18) comprising a second thread (17) interacting in a mounted position with the first thread (16) of the sleeve (14). A clamping means (19) for the cable is arranged at the second end (12) of the plug body (10). It interacts in the mounted position with the (Continued)

gland nut (18), thereby clamping the cable in the mounted position with respect to the enclosure (1).

15 Claims, 3 Drawing Sheets

(51) Int. Cl.
 *H01R 13/52* (2006.01)
 *H01R 13/625* (2006.01)
 *H01R 13/74* (2006.01)

(52) U.S. Cl.
 CPC ......... *G02B 6/3887* (2013.01); *G02B 6/3891* (2013.01); *G02B 6/3897* (2013.01); *H01R 13/5205* (2013.01); *H01R 13/625* (2013.01); *H01R 13/74* (2013.01)

(58) Field of Classification Search
 CPC .............. H01R 13/622; H01R 13/6582; G02B 6/3849; G02B 6/3879; G02B 6/3887
 USPC ........................................................ 439/460
 See application file for complete search history.

(56) References Cited

U.S. PATENT DOCUMENTS

| 5,580,278 | A  | * | 12/1996 | Fowler ................. H01R 13/622 |
| | | | | 439/321 |
| 6,406,329 | B1 | | 6/2002 | Lazaro, Jr. |
| 8,221,164 | B1 | * | 7/2012 | Lazaro, Jr. ............. H01R 9/032 |
| | | | | 439/607.41 |
| 2004/0121650 | A1 | * | 6/2004 | Lazaro, Jr. ............. H01R 9/032 |
| | | | | 439/598 |
| 2009/0264021 | A1 | | 10/2009 | Feldner |
| 2012/0076463 | A1 | | 3/2012 | Hattori |
| 2015/0338584 | A1 | | 11/2015 | Islam |

FOREIGN PATENT DOCUMENTS

| DE | 29915382 U1 | 2/2001 |
| EP | 2354825 A1 | 8/2011 |
| WO | 2008/128940 A1 | 10/2008 |

\* cited by examiner

ENCLOSURE FOR A CONNECTOR ON A CABLE

This application is a national stage application under 35 U.S.C. § 371 of International Application No. PCT/EP2017/065205, filed Jun. 21, 2017, which claims the benefit of priority of Swiss Patent Application No. 00805/16, filed Jun. 24, 2016.

FIELD OF THE INVENTION

The present invention is directed to an enclosure for connector on a cable with respect to housings, in particular for fiber-optic connectors.

BACKGROUND OF THE INVENTION

Enclosures for inserting cables into housings are known from the prior art, which at the same time are used as strain relief or for kink protection. Typical representatives have a cap with an opening which is surrounded by a thread. The opening is normally suitable for holding a chuck, which can be drawn in by a cap nut which interacts with the thread. Complex plug-like apparatuses are known in which the connectors for the optical waveguide are firmly integrated in an outer housing.

In the case of outdoor applications, the connector connects an end of a cable to an outdoor apparatus. Hence, the need arises to seal the connector of outer influences and e.g. provide a waterproof connector sealing, which is at the same time still easily join- and disconnectable.

Environmental sealing structures for the protection of the connectors are known from the prior art, such as the publication US2015338584, published on 26 Nov. 2015 by Commscope Technologies LLC, which relates to a sealing enclosure for a connector on a terminated end of a cable including an inner housing and an outer housing. The inner housing is permanently affixed and sealed to a section of the cable adjacent to the connector. The outer housing slides over the inner housing and has attachment features at a forward end of the outer housing for attaching to an enclosure surrounding a port for the connector. In a further embodiment, the outer housing has a sealing member attached to an inner circumference thereof, wherein, when the outer housing is slid forward along the inner housing, the sealing member engages an outer surface of the inner housing to seal the outer housing to the inner housing.

EP2354825A1 was first published on 1 Aug. 2010 by Tyco Electronics Netherland BV. It is directed to an enclosure assembly for at least one connector. It comprises an enclosure having a connector volume configured to receive the connector and an opening with a strain relief element being adapted to receive a cable. The strain relief element is provided with a relief portion at one end to support the cable elastically. It further comprises a fastening portion, which in a mounted state is arranged at least partially within the opening. To create an enclosure which is easy to mount and assures a reliable anchorage of the cable within the enclosure, in a premounted state, the enclosure and the strain relief element are adapted to be slid relative to each other in a forward direction up to a forward position. In the forward position, the enclosure is automatically engaged in a friction lock with the fastening portion.

DE3604213, published on 13 Aug. 1987 by Hermann Holzmann, relates to a plastic screw union, which may serve as a sealing and strain relief of cables. The union consists of an intermediate connecting stub with a sealing body and cap. Clamping tongues are arranged coaxially on the hollow cylindrical intermediate connecting stub such that, during rotation of the cap nut of the sealing bodies, they press against the inserted cable. It is further proposed to fit latching tabs, which project on to the other part, to the cap nut or intermediate connecting stub, preferably distributed uniformly around the circumference. In that way preliminary fixing between the cap nut and the intermediate connecting stub is possible just by pushing on. Hence, the latching tabs form a type of elastic preliminary thread, from whose locking position further screwing on of the cap nut is directly possible. Furthermore, raised holding ribs are arranged on the inner surfaces of the clamping tongues, which form an annular assembly, which holding ribs fix the sealing body in a preliminary manner while the latter is being inserted.

US2012076463, published on 28 Mar. 2012 by Fujitsu Ltd, relates to an optical connector assembly with a waterproof housing. By fitting a waterproof cover provided on the outer side of the apparatus so as to surround the optical module with the waterproof cover provided an the optical module side, the connection portion between the optical module and the LC optical connector is completely covered and thus the connecting portion of the optical connector with the apparatus is made waterproof. Hereby, the engagement of an internal screw thread of the waterproof cover with the external screw thread of the rear housing of the connector effectively makes the connecting portion of the rear housing and the cover waterproof.

DE3512578, published on 16 Oct. 1986 by Franz Bunder GmbH and Co Elektrische Bauelemente KG, solely relates to a strain relief device for a cable, having a clamping piece with elastically sprung clamping tongues and a compression element. According to the invention, the clamping tongues are profiled such that, during the clamping process, they rest over the entire circumference on the cable which is to be clamped in. However, the strain relief device is not reported to provide sealing.

The currently used sealing enclosures of fiber-optic connectors often suffer from radial tolerances between the individual parts leading to leakage of the sealing enclosure if outer forces are applied and the structure bends up.

SUMMARY OF THE INVENTION

It is an object of the invention to avoid at least one of the problems known from the prior art.

An enclosure according to the invention for a connector on a cable normally comprises a flange having a base plate with an opening for the cable, respectively the connector on the cable, if appropriate. The flange is normally foreseen to be mounted to or integrated in a housing of a device. Depending on the field of application, it can be attached to a second cable, if appropriate. The flange comprises first connecting means. In a preferred variation, they are arranged around the opening. The enclosure further comprises a plug with a plug body with a first end foreseen to interact in a mounted position with the flange, e.g. the base plate and/or the opening and/or the first connecting means. The plug body comprises a second end as will be described hereinafter. In a preferred variation, the plug body comprises a tubular design such that the cable and, if appropriate, the connector on the cable can pass through. Thereby, it is possible to apply the enclosure to optical and/or electrical cables to which a respective optical and/or electrical connector is already attached.

The plug further comprises a sleeve (locking sleeve) encompassing in a mounted position the plug body and comprising second connecting means foreseen to interact in a mounted position with the first connecting means of the flange and comprising a first thread (third connecting means). A gland nut comprising a second thread (fourth connecting means) is foreseen to interact in a mounted position with the first thread of the locking sleeve, thereby acting upon a clamping means for the cable arranged in the region of the second end of the plug body and interacting in the mounted position with the gland nut such that the cable is clamped with respect to the enclosure. In a preferred embodiment the sleeve comprises an inner thread (third connecting means) and the gland nut comprises an outer thread (fourth connecting means) which are foreseen to cooperate with each other.

In a variation, the first and the second connecting means are of a bayonet lock type, wherein the first connecting means comprise a first and a second pin arranged opposite to each other and the second connecting means comprise a first and a second groove of the bayonet lock foreseen to interact with the first and the second pin. Alternatively, the first and the second connecting means can be of a regular thread type. In a variation, the third connecting means and the second connecting means are the same thread. In a preferred variation, the clamping means comprises a sealing bushing encompassing the cable. The sealing bushing is preferably shaped, such that it can be applied to the cable when the connector is already connected to the cable. E.g. the sealing bushing can be laterally slit such that it is mountable on the cable in a lateral direction. The sealing bushing may form part of the clamping means which in the mounted position is compressed between the plug body and the gland nut thereby acting on the cable. The clamping means may comprise clamping fingers deformable in a radial direction. The clamping fingers may act directly or indirectly, e.g. via the sealing bushing on the cable. The clamping fingers, which are arranged between the sealing bushing and the gland nut, may prevent direct contact between the sealing bushing and the gland nut thereby reducing friction. The clamping fingers may be incorporated in the region of the second end of the plug body in the plug body The plug body may comprise a first shoulder supporting the plug body in the mounted position in the axial direction with respect to the flange preventing negative tilting of the plug body with respect to the flange. To exert a force in axial direction the plug body may comprise a second shoulder supporting the plug body in the mounted position in the axial direction with respect to the gland nut. Unwanted lateral distortion of the plug with respect to the flange, even under high lateral forces, can be effectively prevented.

To attach an enclosure as described herein to a cable the following steps are normally taken:
(a) Provide a flange and a plug as described herein;
(b) If appropriate, attach the flange to a housing;
(c) Provide a cable with a connector on it;
(d) Arrange the gland nut first and then the sleeve on the cable;
(e) If present, arrange the sealing bushing on the cable;
(f) Arrange the plug body on the cable;
(g) Insert the sealing bushing in the rear end of the plug body;
(h) If appropriate interconnect the connector on the cable to its counterpart at the housing;
(i) Connect the plug body to the flange, e.g. by inserting the plug body into the opening of the flange;
(j) Attach the sleeve to the flange by interconnecting the first and the second connecting means, i.e. the bayonet lock;
(k) Interconnect the gland nut to the plug body by interconnecting the third and the fourth connecting means thereby tensioning the clamping means on the cable.

Depending on the field of application the order of the method steps can be changed. If appropriate, a first locking means can be arranged between the sleeve and the flange, preventing unwanted rotation of the sleeve with respect to the flange in a mounted position. In a preferred variation, the gland nut is supported by the plug body. By attaching the gland nut to the sleeve, the sleeve is pulled away from flange whereby the sleeve is secured against unintended loosening of the sleeve with respect to the flange. This can be achieved in that the pins of the first connecting means are pulled into an undercut arranged in the grooves of the second connecting means as described hereinafter. Alternatively or in addition, a further locking means can be arranged between the gland nut and the plug body and/or the gland nut and the sleeve preventing unwanted rotation of the respective elements. A locking element can be e.g. realized by a snap tongue which interacts in the mounted position with a counter element, such as e.g. a correspondingly forms notch. The snap tongue can be released by deformation of the snap tongue and/or the counter element.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE DRAWINGS

The herein described invention will be more fully understood from the detailed description given herein below and the accompanying drawings which should not be considered limiting to the invention described in the appended claims. The drawings are showing:

FIG. 6 a side view of a part of the enclosure with hidden lines turned on.

DETAILED DESCRIPTION OF THE INVENTION

The foregoing summary as well as the following detailed description of the preferred embodiments, are better understood when read in conjunction with the appended drawings. For the purposes of illustrating the invention, an embodiment that is presently preferred, in which like numerals represent similar parts throughout the several views of the drawings, it being understood, however, that the invention is not limited to the specific methods and instrumentalities disclosed.

Figure 1:
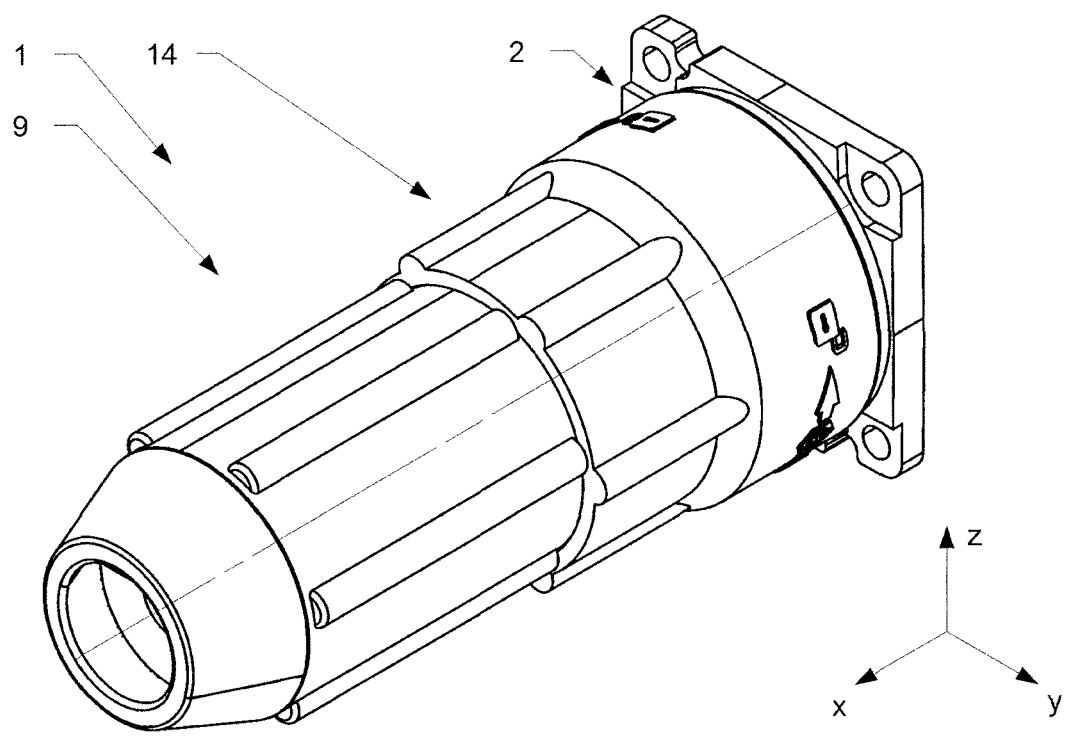
FIG. 1 an enclosure in a perspective manner in an assembled position.
Figure 2:
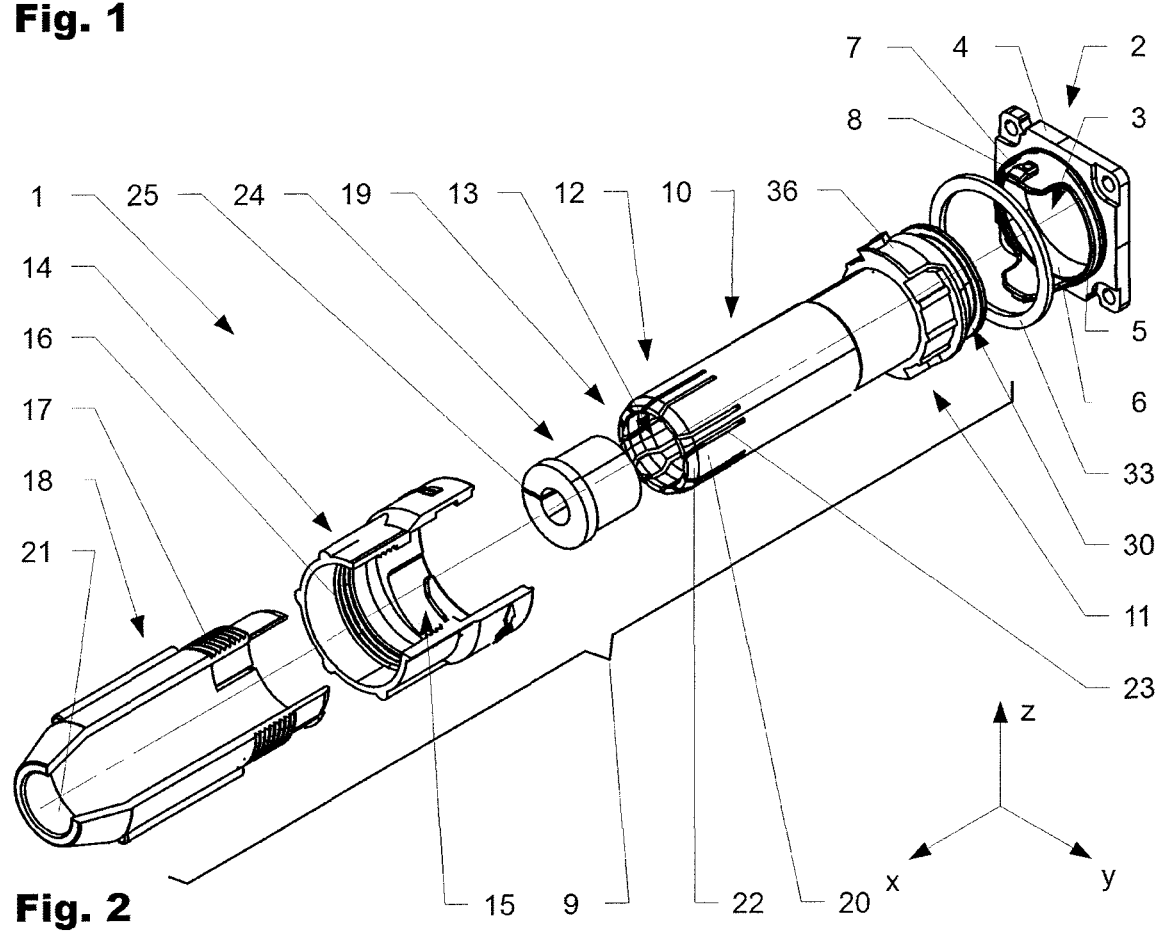
FIG. 2 the enclosure according to FIG. 1 in an exploded view.
Figure 3:
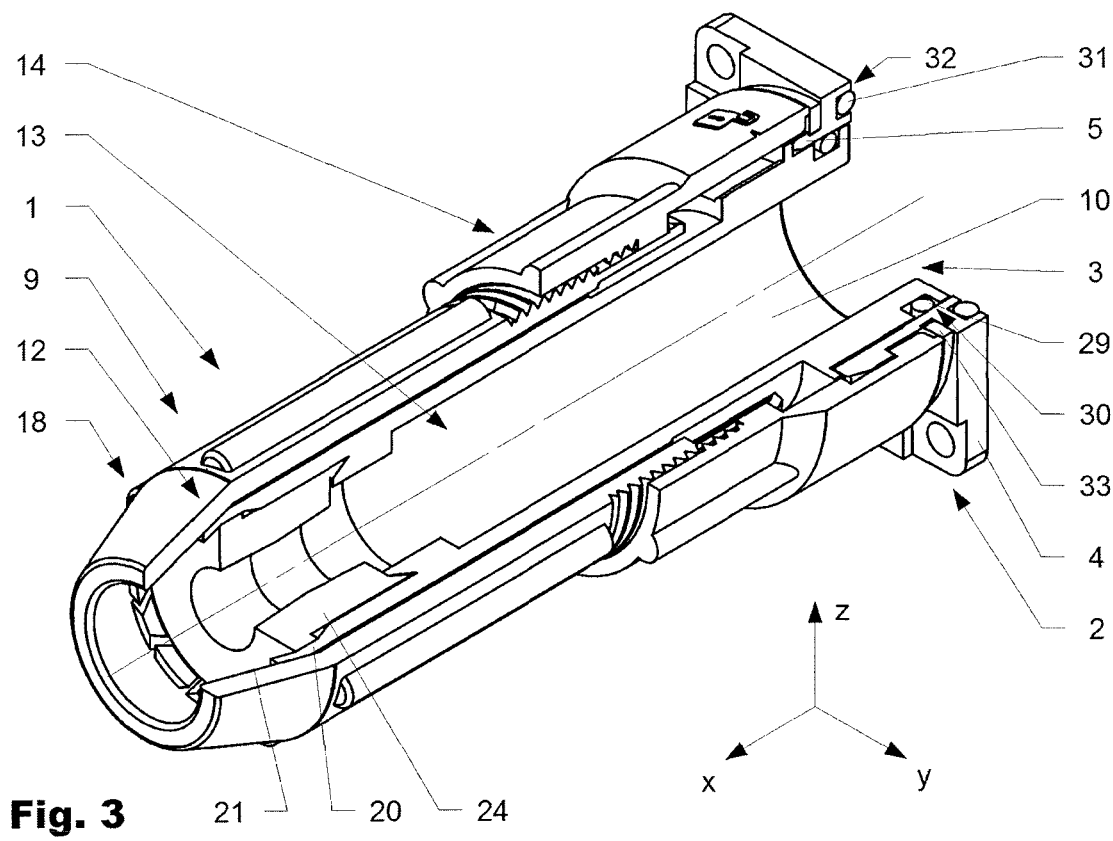
FIG. 3 the enclosure according to FIG. 1 in a partially cut manner and in an unclamped position.
Figure 4:
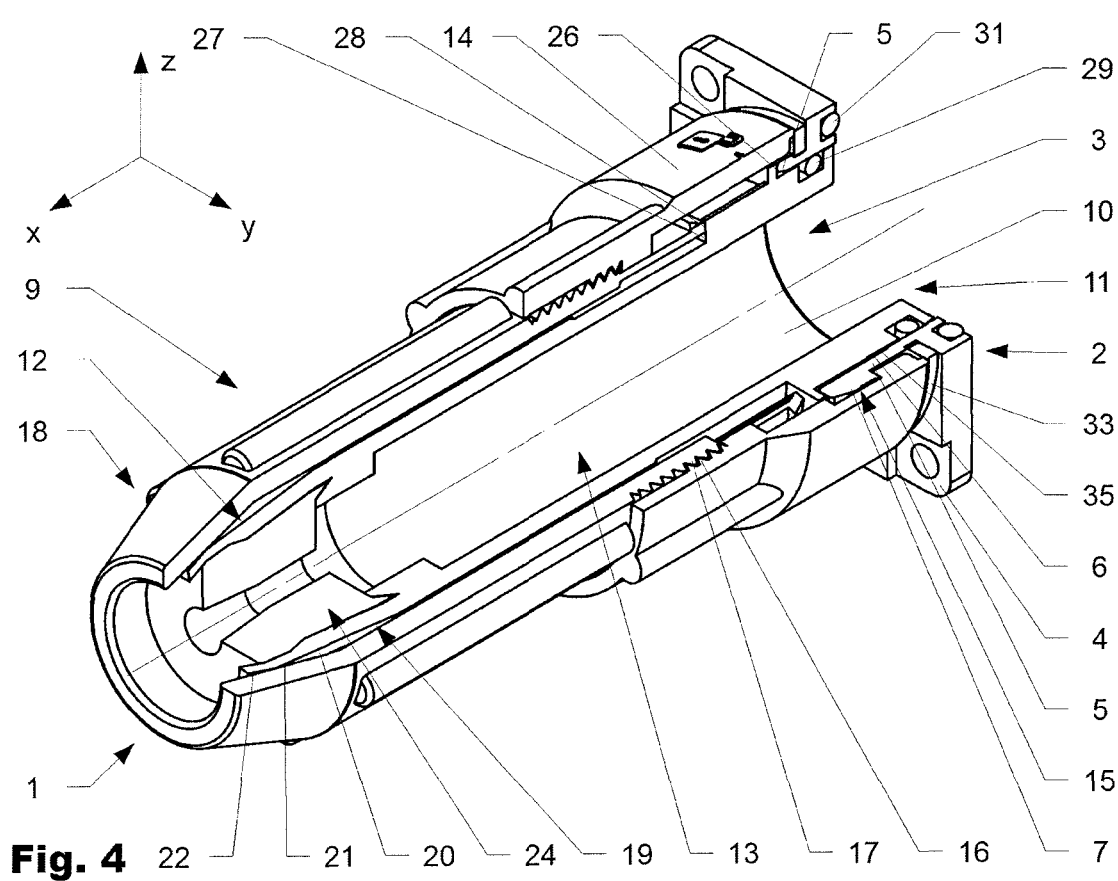
FIG. 4 the enclosure according to FIG. 1 in a partially cut manner and in a clamped position.

FIG. 1 shows in a perspective view a first variation of an enclosure 1 according to the invention in an assembled position. FIG. 2 shows the same variation in an exploded manner. FIG. 3 shows the enclosure 1 in a partially sectional view in a first, unclamped position and FIG. 4 shows the enclosure 1 in a second, clamped position.

The enclosure 1 comprises a flange 2 and a plug 9 mechanically interconnectable to the flange 2 as described hereinafter. The flange 2 features an opening 3 for at least one cable and/or connector (electrical and/or optical). The opening 3 is arranged in a base plate 4 for the interconnection of the enclosure 1 to a housing (not shown here). The base plate 4 features a supporting area which rests against the housing when mounted. In the middle of the flange 2 an opening 3 is placed. The opening 3 is surrounded by a collar 5 providing on the inside a first supporting surface 6 and adjacent a first and a second pin (first connecting means) 7 arranged diametral to each other with respect to the opening 3 and in the shown variation protruding from aligning means 8 in a radial direction. In the mounted position, the first supporting surface 6 is aligned to a corresponding second supporting surface 35 arranged at the plug housing 10. The two supporting surfaces 6, 35 can be mated with each other by inserting the plug housing 10 into the opening 3 of the flange 2. The two supporting surfaces 6, 35 are designed such that they prevent unwanted tilting of the plug 9 with respect to the flange 2 when a lateral force (not shown in detail) is applied. Alternatively or in addition, further means to prevent unwanted lateral tilting of the plug 9 with respect to the flange 2 can be present as described hereinafter.

The plug 9 comprises a plug body 10 with a first end 11 foreseen to interact in a mounted position with the flange 2 and a second end 12 as described herein after. The plug body 10 comprises a tubular design with a central hole 13 extending in axial direction (x-direction) from the first end 11 to the second end 12. The central hole 13 is foreseen to receive a cable and/or a connector (both not shown in detail). The diameter of the central hole 13 is preferably chosen such that the connector can be inserted already on the cable, i.e. the diameter of the central hole is bigger than the smallest diameter of the connector. One advantage of the shown enclosure 1 is that it can be used with optical and/or electrical cables to which a respective optical and/or electrical connector is already attached.

The plug 9 comprises a sleeve 14 (shown in FIG. 2 in a partially cut manner) which in a mounted position encompasses the plug body 10. The sleeve 14 comprises first and second grooves (second connecting means) 15 foreseen to interact during mounting with the pins (first connecting means) 7 of the flange 2. As can be seen, the pins and the corresponding grooves 7, 15 are forming a bayonet lock to easily and securely connect the plug 9 to the flange 2. The sleeve 14 further comprises an inner first thread (third connecting means) 16 which interacts in a mounted position with a second thread (fourth connecting means) 17 of a gland nut 18 (shown in FIG. 2 in a partially cut manner). Alternatively, the first and the second connecting means 7, 15 can e.g. be of regular thread type. If appropriate, the third connecting means 16 and the second connecting means 15 can be the same thread. Depending on the field of application the third and the fourth connecting means 16, 17 can be of a similar type as the first and the second connecting means 7, 15, i.e. of a bayonet lock type. In other variation the third and the fourth connecting means are incorporated as a clamping lever by which the sleeve and the gland nut are tension assembled exerting a force in the axial direction which helps to secure the plug 9 with respect to the flange 2 and prevents lateral tilting.

A clamping means 19 is arranged between the second end 12 of the plug body 10 and the gland nut 18. The clamping means 19 comprises flexible clamping fingers 20, which are deformable in a radial direction by the gland nut 18. In the shown variation, the gland nut 18 comprises a ramp 21, which interacts with an outer end 22 of the clamping fingers 20 when screwing the gland nut 18 to the sleeve 14. In the shown variation, the clamping fingers 20 are integrated into the plug body 10 forming part thereof. The clamping fingers 20 are separated by each other by gaps 23. In the shown variation, the clamping means comprises a sealing bushing 24 which in a mounted position is arranged on the cable (not shown in detail). The sealing bushing 24 can comprise a slit 25 which is shaped, such that it can be applied to the cable when the connector is already connected to the cable. In the shown variation, the sealing bushing 24 forms part of the clamping means 19. It is arranged between the clamping fingers 20 and a cable and is in a mounted position compressed between the inwardly deformed clamping fingers 20 of the plug body 10 and the gland nut 18 (see FIG. 4), thereby acting on the cable (not shown in detail). The clamping fingers 20 prevent direct contact between the sealing bushing 24 and the gland nut 18, thereby reducing friction and wear.

Figure 5:
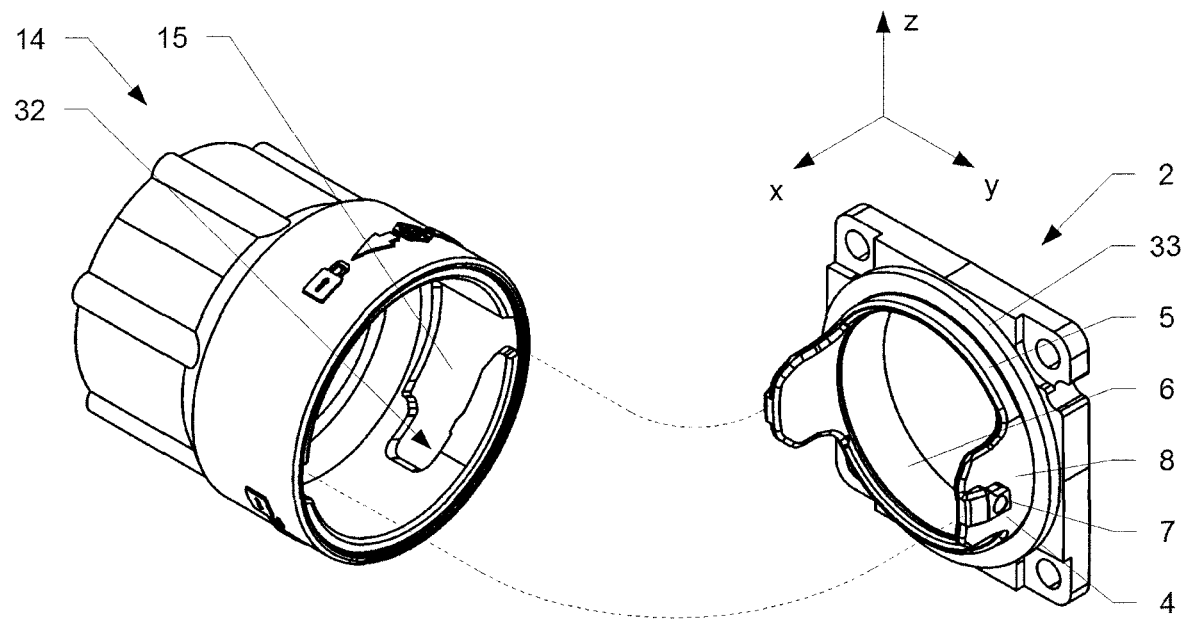
FIG. 5 the interconnection of a sleeve and a flange.
Figure 6:
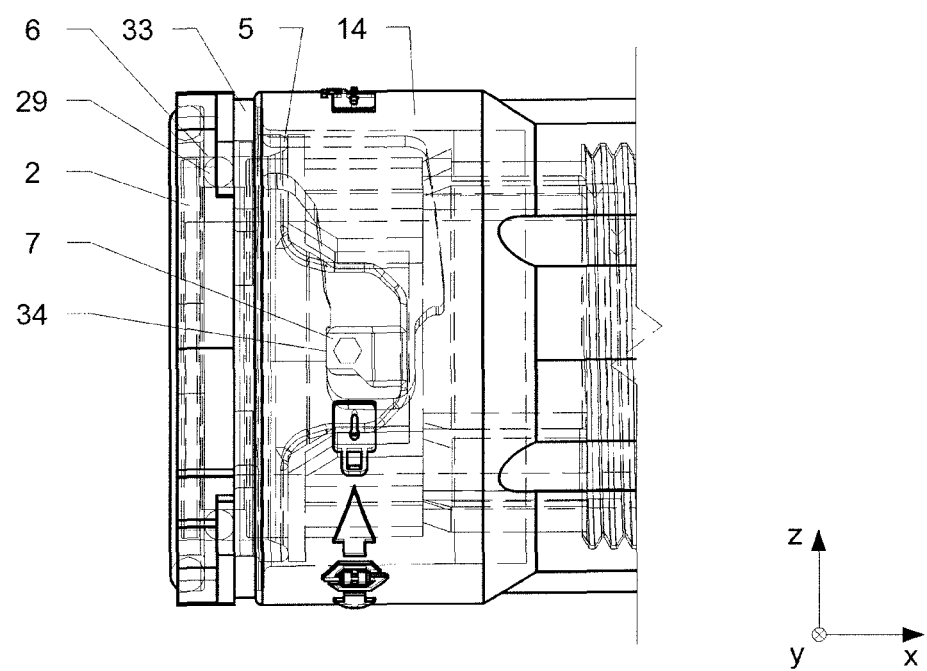

As visible in FIG. 4, the plug body 10 may comprise a first shoulder 26 supporting the plug body 10 in the mounted position in the axial direction (x-direction) with respect to the collar 5 of the flange 2 helping to prevent negative tilting of the plug body 10 with respect to the flange 2. To exert a force in axial direction, the plug body 10 comprises a second shoulder 27 supporting the plug body 10 in the mounted position in the axial direction with respect to an end 28 of the gland nut 18. By attaching the gland nut 18 to the sleeve 14, the sleeve 14 is pulled away from the flange 2. As best visible in FIG. 6, which shows the sleeve 14 and the flange 2 in a mounted position in a side view, thereby the pins 7 of the first connecting means are pulled into an undercut 34 arranged at the grooves 15 of the second connecting means 15. The undercut prevents that the sleeve 14 can be unlocked when the gland nut 18 is tightened. Alternatively or in addition, other locking means can be foreseen which prevent an unwanted rotation between the sleeve 18 and the flange 2. FIG. 5 shows the sleeve 14 and the flange 2 in an isolated manner. The pins 7 and the corresponding grooves 15 are visible, as well as the undercut 34 arranged in the groove 15 in an axial direction. Assembly of the two elements is schematically indicated by dashed lines. The aligning means 8 protrude from the base plate 4 and are foreseen to interact with corresponding recesses 36 in the plug body 10 (see FIG. 2), thereby preventing rotation of the plug body 10 with respect to the flange 2.

By fastening the gland nut 18, the gland nut 18 exerts a force on the plug body 10 by the clamping means 19 (by the interaction of ramp 21 and clamping fingers 20). This force is transferred by the first shoulder 26 to the collar 5. When the gland nut 18 is further fastened the stop 28 interacts with second shoulder 27 arranged at the plug body 10. Thereby, the plug housing 10 is in addition firmly secured with respect to the flange resulting in a very robust interconnection between the plug 9 and the flange 2 even by high lateral forces. An unwanted mechanical deformation and potential leakage can be efficiently prevented.

The flange 2 and/or the sleeve 14 and/or the gland nut 18 are preferably made from a die casted metallic material or a plastic material. The plug body 10 which in the shown variation integrally comprises the clamping fingers 20, is preferably made from a plastic material which is sufficient elastically deformable such that the clamping fingers 20 can be deformed inwardly without suffering damage. The sealing bushing 24 is preferably made from a permanently elastic rubber material or the like.

FIG. 3 shows the enclosure 1 in a not yet fully assembled state. As visible, the first end of the plug body 10 is inserted in the opening 3 of the flange 2 and the sleeve 14 is attached to the flange 2 by the first and the second connecting means 7, 15 of the bayonet lock. The sealing bushing 24 is inserted between the clamping fingers 20. To prevent unwanted axial movement of the sealing bushing 24, the sealing bushing 24 sits on a stop 28 in the form of reduction of the inner diameter of the central hole 13 of the plug body 10. By screwing the outer second thread (fourth connecting means) 17 of the gland nut 18 into the inner first thread (third connecting means) 16 of the sleeve, the ramp 21 of the gland nut 18 interacts with the outer ends 22 of the clamping fingers 20 and thereby deforms them elastically inwardly. This deformation is transmitted onto the sealing bushing 24 which is made from a rubber like soft material. Between the plug body 10 and the flange 2 a first O-ring 29 is arranged in a circumferential notch 30 arranged in the second supporting surface 35. The first O-ring 29 acts as a seal between the plug body 10 and the flange 2. A second O-ring 31 is arranged in a second notch 32 in the base plate 4 of the flange 2. This second O-ring 31 is foreseen to seal the base plate 4 with respect to a housing (not shown in detail) to which the flange 2 is attached. A spring washer 33 is arranged in axial direction (x-direction) between the sleeve 14 and the flange 2. The spring washer 33 is preferably made from an elastic material and can be designed, such that it is slightly compressed when the sleeve 14 is attached to the flange 2 thereby exerting a force on the sleeve in axial direction. This can be helpful to keep the pin 7 in the undercut 34. The spring washer can be formed from metal, e.g. in form a thin sheet of spring steel which is 3D-formed which exerts a force when compressed in axial direction.

Rather, the words used in the specification are words of description rather than limitation, and it is understood that various changes may be made without departing from the Spirit and scope of the invention.

LIST OF DESIGNATIONS

| | |
|---|---|
| 1 | Enclosure |
| 2 | Flange |
| 3 | Opening (flange) |
| 4 | Base plate (flange) |
| 5 | Collar (flange) |
| 6 | First supporting surface (opening flange) |
| 7 | Pin/First connection means (flange) |
| 8 | Aligning means (flange) |
| 9 | Plug |
| 10 | Plug body |
| 11 | First end (plug body) |
| 12 | Second end (plug body) |
| 13 | Central hole/inner space (plug body) |
| 14 | Sleeve |
| 15 | Grooves/Second connecting means (sleeve) |
| 16 | First thread/third connecting means (sleeve) |
| 17 | Second thread/fourth connecting means (gland nut) |
| 18 | Gland nut |
| 19 | Clamping means |
| 20 | Clamping fingers |

-continued

LIST OF DESIGNATIONS

| | |
|---|---|
| 21 | Ramp (gland nut) |
| 22 | Outer end (clamping fingers) |
| 23 | Gap (between clamping fingers) |
| 24 | Sealing bushing |
| 25 | Slit (sealing bushing) |
| 26 | First shoulder (plug body) |
| 27 | Second shoulder (plug body) |
| 28 | Stop (for sealing bushing) |
| 29 | O-ring (plug body) |
| 30 | Notch (plug body) |
| 31 | O-ring (flange) |
| 32 | Notch (flange) |
| 33 | Seal (flange, axial direction) |
| 34 | Undercut (Groove, first locking means) |
| 35 | Second supporting surface |
| 36 | Recess (plug body) |

The invention claimed is:

1. An enclosure for a connector on a cable, the enclosure comprising:
   a. a flange having a base plate with an opening configured to receive the cable with the connector being attached to the cable, and first connecting means arranged around the opening;
   b. a plug comprising
      i. a plug body with a first end to interact in a mounted position with the base plate of the flange and a second end, wherein the plug body comprises a first shoulder supporting the plug body in the mounted position in the axial direction with respect to the flange, and wherein the plug body comprises a second shoulder supporting the plug body in the mounted position in the axial direction with respect to the gland nut;
      ii. a sleeve encompassing in a mounted position the plug body and comprising second connecting means to interact in the mounted position with the first connecting means of the flange and comprising a third connecting means
      iii. a gland nut comprising a fourth connecting means interacting in a mounted position with the third connecting means of the sleeve exerting a force in an axial direction (x) onto the plug body, and
      iv. a clamping means for the cable arranged at the second end of the plug body and interacting in the mounted position with the gland nut thereby clamping the cable in the mounted position with respect to the enclosure,
   wherein, by fastening the gland nut, the gland nut exerts a force on the plug body which is transferred by the first shoulder to the flange, and an end of the gland nut interacts with the second shoulder.

2. The enclosure according to claim 1, wherein the first connecting means comprise a first and a second pin of a bayonet lock and the second connecting means comprise a first and a second groove of the bayonet lock to interact with the first and the second pin.

3. The enclosure according to claim 1, wherein the third connecting means is a first thread and the fourth connecting means is a second thread foreseen to interact with the first thread.

4. The enclosure according to claim 1, wherein the clamping means comprises a sealing bushing encompassing the cable.

5. The enclosure according to claim 4, wherein the sealing bushing is laterally slit such that it is mountable on the cable in a lateral direction.

6. The enclosure according to claim 4, wherein the sealing bushing comprises a bend protection for the cable which extends above the rear end of the enclosure.

7. The enclosure according to claim 4, wherein the sealing bushing in the mounted position is compressed between the plug body and the gland nut.

8. The enclosure according to claim 1, wherein the clamping means comprises clamping fingers deformable in a radial direction thereby in the mounted position clamping the cable in the radial direction.

9. The enclosure according to claim 8, wherein the clamping fingers are incorporated in the region of the second end in the plug body.

10. The enclosure according to claim 2, wherein the third connecting means is a first thread and the fourth connecting means is a second thread foreseen to interact with the first thread.

11. The enclosure according to claim 2, wherein the clamping means comprises a sealing bushing encompassing the cable.

12. The enclosure according to claim 3, wherein the clamping means comprises a sealing bushing encompassing the cable.

13. The enclosure according to claim 11, wherein the sealing bushing is laterally slit such that it is mountable on the cable in a lateral direction.

14. The enclosure according to claim 12, wherein the sealing bushing is laterally slit such that it is mountable on the cable in a lateral direction.

15. Method to attach an enclosure to a cable comprising the following method steps:

a. providing a flange comprising a base plate with an opening configured to receive the cable and first connecting means;

b. providing a plug comprising a plug body having a first end and a second end, a sleeve having second and third connecting means and a gland nut having fourth connecting means, wherein the plug body comprises a first shoulder configured to support the plug body in a mounted position in an axial direction with respect to the flange, and wherein the plug body comprises a second shoulder configured to support the plug body in the mounted position in the axial direction with respect to the gland nut;

c. attaching the flange to a housing;

d. providing the cable with a connector on it;

e. arranging the gland nut first and then the sleeve on the cable;

f. arranging the sealing bushing on the cable;

g. arranging the plug body on the cable;

h. inserting the sealing bushing in the second end of the plug body;

i. connecting the first end of the plug body to the flange;

j. attaching the sleeve to the flange by interconnecting the first and the second connecting means; and k. interconnecting the gland nut to the plug body by interconnecting the third and the fourth connecting means thereby tensioning the clamping means on the cable, wherein, by fastening the gland nut, the gland nut exerts a force on the plug body which is transferred by the first shoulder to the flange, and an end of the gland nut interacts with the second shoulder.

* * * * *